Dec. 29, 1959  A. C. HUGHES, JR., ET AL  2,918,817
FLUID STREAM DIRECTION INDICATOR WITH MECHANICAL FILTER
Filed Oct. 3, 1955  3 Sheets-Sheet 1

ARTHUR C. HUGHES, JR.,
GENE W. SMITH,
INVENTORS.

BY
Barksdale & Scantlebury
ATTORNEYS

Dec. 29, 1959  A. C. HUGHES, JR., ET AL  2,918,817
FLUID STREAM DIRECTION INDICATOR WITH MECHANICAL FILTER
Filed Oct. 3, 1955  3 Sheets-Sheet 2

ARTHUR C. HUGHES, JR.,
GENE W. SMITH,
INVENTORS.

BY
Barbelew & Scantlebury
ATTORNEYS

Dec. 29, 1959   A. C. HUGHES, JR., ET AL   2,918,817
FLUID STREAM DIRECTION INDICATOR WITH MECHANICAL FILTER
Filed Oct. 3, 1955   3 Sheets-Sheet 3
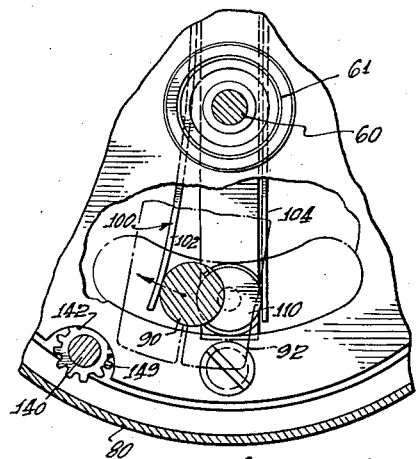
Fig. 4.
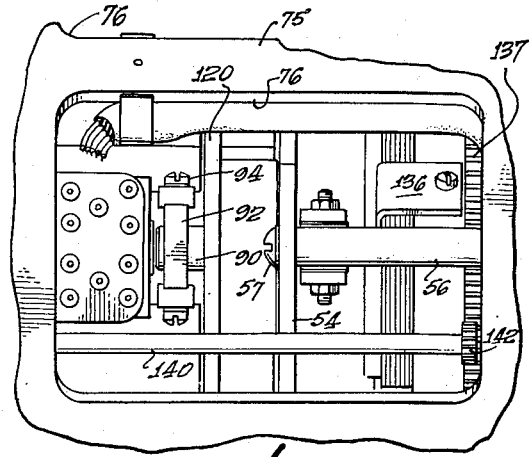
Fig. 6.
Fig. 5.
ARTHUR C. HUGHES, JR.,
GENE W. SMITH,
INVENTORS.
BY
Barbelew & Scantlebury
ATTORNEYS

২,918,817

FLUID STREAM DIRECTION INDICATOR WITH MECHANICAL FILTER

Arthur C. Hughes, Jr., Pacific Palisades, and Gene W. Smith, La Canada, Calif., assignors to G. M. Giannini & Co., Inc., Los Angeles, Calif., a corporation of New York Application October 3, 1955, Serial No. 537,977

6 Claims. (Cl. 73—180)

A primary object of the present invention is to provide a mechanical mechanism capable of transmitting movements of relatively low frequency and of absorbing movements of higher frequency. By analogy with known electrical networks, such a device may be characterized as a mechanical low band pass filter.

A further object of the invention is to provide a mechanical low band pass filter having such particularly desirable properties as a relatively sharp effective cut-off and a highly sensitive and accurate response to low frequency movements.

The invention further provides an instrument for sensing and then transmitting, measuring or indicating the direction of an air stream, as, for example, in an angle of attack transmitter for use on aircraft. As typically embodied in such an instrument, the invention provides angle of attack data of improved accuracy and utility by filtering out variations in the angle of attack that occur with a frequency greater than about ten cycles per second, for example. At the same time, variations having a frequency of one or two cycles per second may be transmitted with little attenuation; and still lower frequencies are reproduced with remarkable accuracy and sensitivity.

A particular advantage of the invention is that it provides the described type of filtering action by means of a mechanical device. Such a mechanical filter is simpler and more reliable to maintain than the electrical devices that may provide roughly similar action. Moreover, electrical filtering is conveniently applicable only to certain types of output signal. And, in the particular range of cut-off frequencies required for angle of attack transmission, electrical filters tend to be particularly cumbersome and expensive.

The invention is concerned also with various aspects of the structure and arrangement of angle of attack sensing devices, as will be more fully described.

In measuring many types of physical quantities, difficulty may be caused by relatively high frequency variations, the indication of which would contribute no useful information. Such variations, if recorded or indicated in detail, may seriously confuse the picture. For example, if a physical quantity is to be visually indicated by a pointer, rapid random movement of the pointer tends to obscure its mean position; while if an output signal is used to control some external mechanism, an extreme value of the controlling variable, which may occur only momentarily and therefore not be truly significant, may produce undesired control action.

Such difficulties are overcome by the present invention by provision of mechanical means for separating wanted from unwanted variations of a measured quantity on the basis of the frequency associated with such variations. More particularly, a system in accordance with the invention first translates variations of the quantity to be measured into mechanical movement of an input element, which will be described for clarity as a shaft, but may take many forms partaking of rotary or translational movement. The system then transmits to an output element, which may typically comprise a shaft coaxial with the input shaft, substantially only those components of the input movement representing frequencies lower than some selected cut-off frequency. That is accomplished by coupling the shafts by resilient means that exert upon the shafts yielding torques tending to maintain them in a definite normal relative orientation, and by providing means for damping rotary movement of the output shaft.

A particular advantage of the invention is that the accuracy with which the output element follows low frequency movement of the input element can be made effectively independent of the breakaway or rest friction of the output element bearings. That is accomplished by making the coupling between input and output elements relatively stiff for very small departures from their normal relation, but relatively soft for larger departures therefrom. The torque T exerted upon the output shaft by that coupling is preferably zero in normal relative position of the two shafts; and in other positions has a direction tending to restore the shafts to normal position and a magnitude of the form $$T = K\theta + C \quad (1)$$

where $\theta$ is always positive and represents the magnitude of the angular deviation from normal relation of the two shafts, K is a constant typically representing a spring rate, and C is a constant different from zero. The value of C preferably corresponds to a torque large enough to overcome the rest friction of the output shaft. For output shaft oscillations of appreciable amplitude the natural frequency is then substantially independent of C, and is given approximately by $$W = \frac{1}{2\pi}\sqrt{\frac{K}{I}} \quad (2)$$

where I is the moment of inertia of the output shaft assembly. That natural frequency W, which can typically be made as small as desired, substantially determines the effective cut-off frequency of the mechanism considered as a low band pass filter. To provide a relatively low cut-off frequency, it is often desirable to make the spring rate K small. If C in Equation 1 is zero, the output shaft friction then tends to limit the accuracy of the mechanism for low frequency response, since correction of the output shaft position can take place only when the deviation $\theta$ reaches a value $\theta_0$ large enough to produce a torque that will overcome the breakaway friction F of the output shaft. That condition may be written $$\theta_0 \geq \frac{F}{K} \quad (3)$$

from which it is clear that $\theta_0$, the inherent uncertainty in the output, tends to increase with decreasing spring constant K.

In accordance with the invention, however, the coupling between input and output shafts is of the form (1), with C different from zero and preferably substantially equal to the breakaway friction of the output shaft. The inherent error $\theta_0$ due to breakaway friction then becomes zero, and the accuracy with which low frequency movements may be transmitted is theoretically unlimited, depending only upon structural accuracy of the mechanism. As already stated, the natural frequency W given by Equation 2 applies only for appreciable amplitudes. At very small amplitudes the effective natural frequency depends significantly upon C, becoming large at amplitudes smaller than $\theta_0 = F/K$. The filtering action for very small oscillations is therefore less effective than for oscillations of appreciable amplitude. That, however, is a negligible disadvantage, even from a theoretical viewpoint. In actual practice, the transmission at very low amplitude of oscillations of considerably higher frequency than the otherwise effective cut-off frequency assures that energy will be available in the output portion of the system to overcome the breakaway friction and insure prompt and accurate response.

A full understanding of the invention and of its further objects and advantages will be had from the following description of an illustrative embodiment, of which description the accompanying drawings form a part. Particulars of the embodiment described herein and shown in the drawings are for the purpose of illustration only and are not intended as a limitation upon the scope of the invention, which is defined in the appended claims.

In the drawings:

Fig. 4 is a fragmentary section similar to Fig. 3, but showing the input and output shafts relatively displaced from normal relation;

Fig. 5 is a rear elevation, partially broken away; and

Fig. 6 is a side elevation in aspect indicated by line 6—6 of Fig. 1.

Figure 1:
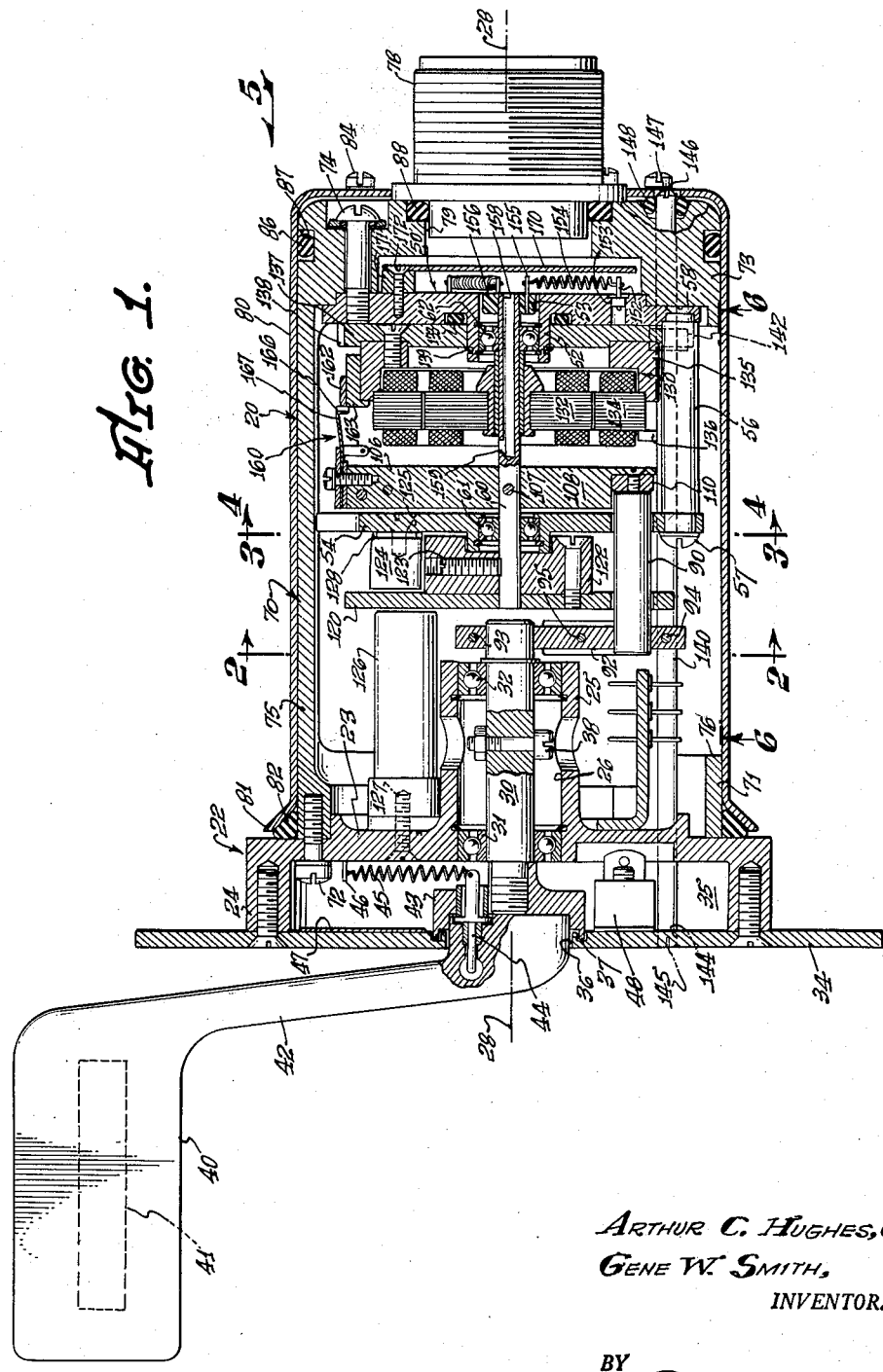
Fig. 1 is a longitudinal axial section of an illustrative mechanism in accordance with the invention.

As illustratively shown, a rigid supporting frame 20 comprises primarily a front member 22, a rear member 50 and a generally cylindrical spider member 70 to which the front and rear members are rigidly but removably connected in spaced relation longitudinally of an axis 28.

Front frame member 22 comprises a transverse circular plate portion 23 with a forwardly extending peripheral flange 24 and a rearwardly extending central boss 25. Plate 23 and boss 25 are coaxially bored at 26 to receive the journal bearings 31 and 32 for the input shaft 30. A centrally apertured front cover plate 34 is peripherally secured to flange 24 of the frame, forming a forward chamber 35 of flat cylindrical shape into which shaft 30 extends. An input connection to shaft 30 may be made in any suitable manner. In the present instrument a vane formation 40 is rigidly mounted on shaft 30 by means of the arm 42 and hub 43. The hub portion of that structure extends through the central aperture 36 in the cover plate, an effective seal against entry of moisture being typically provided by the labyrinth formation shown at 37. Mechanical limit stops are preferably provided for the input system. For example, the head of screw 38 in shaft 30 may engage fixed stop formations of any suitable type projecting inwardly from the inner cylindrical surface of boss 25.

Vane 40 preferably contains an internal electrical heating element, indicated at 41, to prevent formation of ice on its surface, power leads 44 for the heater being brought out in insulated relation through hub 43 and light coil spring connections 45 to fixed terminals 46. A further heating element is preferably provided for front cover plate 34, and may be of flat generally annular form and be applied to the inner face of the plate, as indicated at 47. Heaters 47 and 41 are preferably wired together, for example in series or in parallel, and are both controlled by a single thermostat device that is responsive to the temperature of plate 34. Such a thermostat device is indicated at 48, mounted directly on the inner face of plate 34 within the chamber 35. That arrangement has the advantage of controlling the temperature of vane 40 in accordance with the ambient air temperature and such other factors as air velocity, yet without requiring location of a temperature responsive element within the vane itself.

Rear frame member 50 is essentially a flat circular plate having a forwardly extending boss 52 centrally bored at 53 to receive a bearing 62. A central frame plate 54 is rigidly supported on plate 50 in forwardly spaced relation by means of the posts 56 and screws 57 and 58. Central frame plate 54 is centrally apertured and supports the bearing 61. The output shaft 60 is journaled by means of bearings 61 and 62 in coaxial relation to input shaft 30 and main axis 28.

Figure 2:
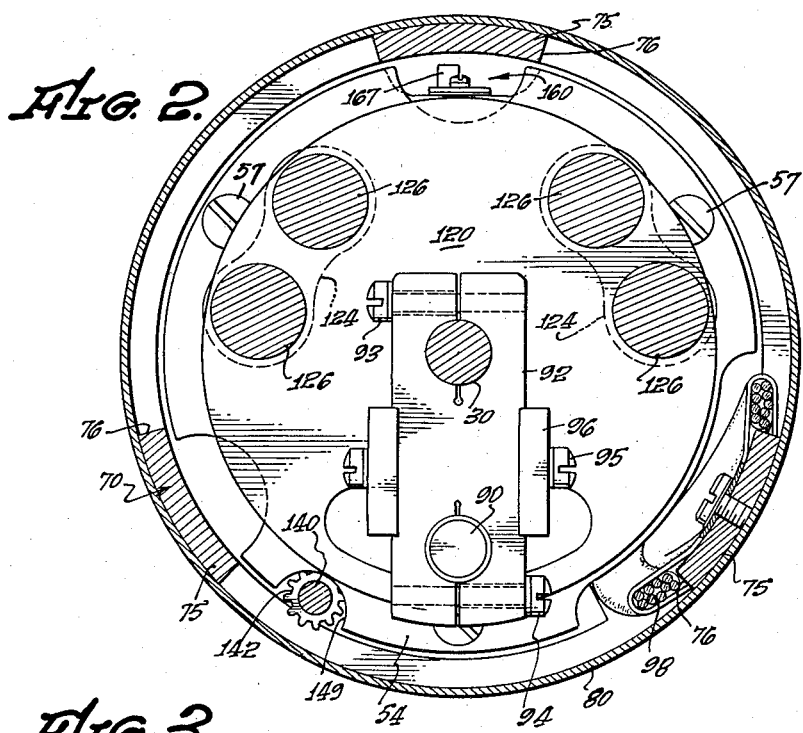
Fig. 2 is a transverse section on line 2—2 of Fig. 1.

Spider frame member 70 comprises forward and rear ring portions 71 and 73, respectively, to which forward and rear frame members 22 and 50 are secured by the screws 72 and 74, respectively, and which are rigidly related by the three parallel post portions 75. As shown, those structural posts are formed as portions of a cylindrical shell pierced by access windows 76. The central aperture 79 of rear ring portion 73 of spider 70 receives the electrical connector fitting 78, through which electrical connections may be made, for example to suitable power sources and indicating instruments. Electrical connections between connector 78 and the various electrical components of the instrument are indicated at 98 in Fig. 2, for example.

A protective cover 80 is of generally cylindrical form with a rear end wall apertured to fit around connector 78. The forward rim of cover 80 is flared at 81 to receive a sealing member, shown as an O-ring 82. When cover 80 is thrust forward by its retaining screws 84, O-ring 82 is pressed forwardly against the rear face of frame plate 22 and also inwardly against the periphery of spider ring portion 71, effectively sealing that portion of the housing. The rearward end of the cover may be sealed by an O-ring 86, which is received in a channel 87 in the outer cylindrical wall of rear spider ring 73 and which engages the inner cylindrical wall of the cover. The joint between connector 78 and frame ring 73 is sealed by an O-ring 83.

Input shaft 30 and output shaft 60 are not rigidly connected, but their movement is related by means of a mechanical filter mechanism now to be described in illustrative form. Certain features of the present embodiment depend upon the fact that movement of vane 40 and hence of input shaft 30 is limited in practice to oscillation within a relatively small angle from a normal position, the total range of movement being typically about 30°. However, it will be understood that in its broader aspects the present type of filter mechanism can readily be adapted to larger ranges of movement, including complete rotation of both input and output shafts.

A contact formation is rigidly mounted on one of the shafts, shown as input shaft 30, in eccentric relation to the shaft axis 28. As shown, that contact formation comprises the pin 90, which is rigidly mounted by means of the crank arm 92 in parallel but offset relation to the shaft. Crank arm 92 may conveniently be formed, as shown best in Fig. 2, as an elongated block with parallel slotted bores at its ends to receive shaft 30 and pin 90, respectively. Clamping screws 93 and 94 insure rigid assembly. Counterweights 96 may be adjustably mounted on crank arm 92, as by the screw 95, to dynamically balance the entire shaft assembly, including vane 40.

Figures 3, 3A:
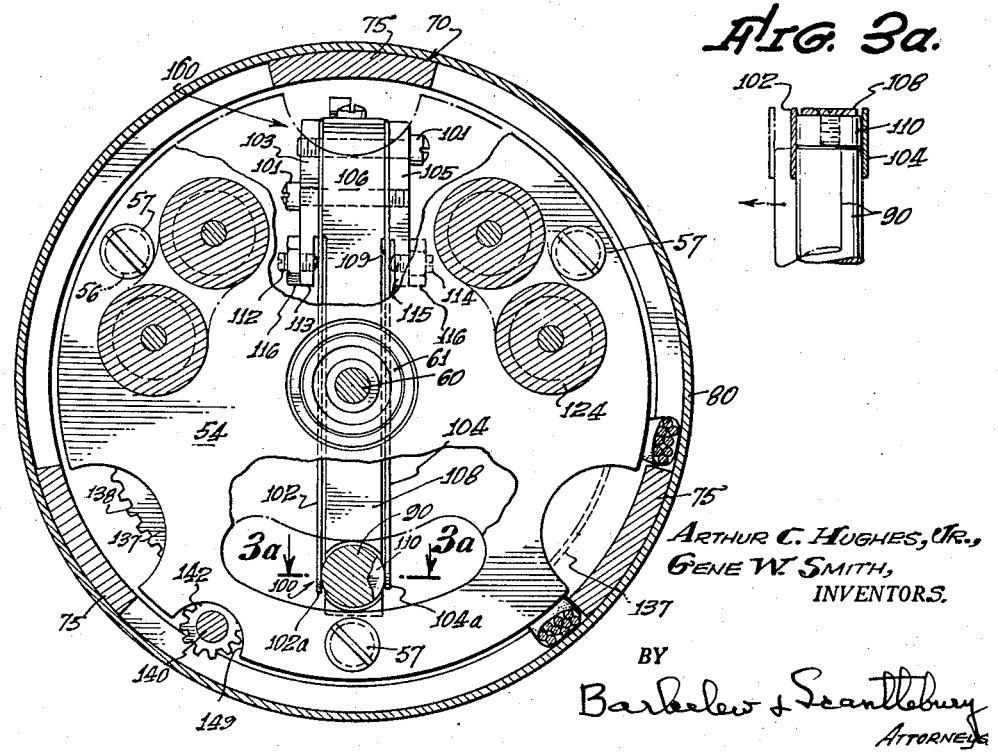
Fig. 3 is a transverse section on line 3—3 of Fig. 1, partially broken away.
Fig. 3a is a fragmentary section on line 3a—3a of Fig. 3.

Resilient means of special type, indicated generally by the numeral 100, are provided on the other shaft, shown as output shaft 60, and are adapted to cooperate with contact pin 90. As shown, two flat spring members 102 and 104 extend generally radially with respect to output shaft 60 and in normally parallel relation, one end of each spring being rigidly mounted on the output shaft and their other ends engaging opposite sides of the free end of pin 90 in normal angular relation of the two shafts. Rotation of input shaft 30 and pin 90 in one direction relative to output shaft 60 then tends to deflect one or other of the driving springs 102, 104, exerting a yielding torque upon the output shaft. Springs 102, 104 preferably extend a full diameter with respect to the offset of contact pin 90. Their fixed ends may be mounted, as shown, near the radially outer end of a spring-supporting arm 106, which is rigidly mounted on output shaft 60, as by the pin 107, and which extends in a direction opposite from contact pin 90 in normal relation of the two shafts. The fixed spring ends are clamped to opposite faces of arm 106 by the keeper plates 103 and 105 and the screws 101, and they extend substantially diametrally on opposite sides of shaft 60 with their free ends 102a and 104a embracing pin 90, as shown clearly in Figs. 3 and 4.

A further feature of the invention comprises spring control means acting to limit deflection of each spring in such a way that whenever the two shafts depart from their normal relation pin 90 can be engaged only by the one spring that tends to restore the shafts to normal relation. A preferred form of such spring control means comprises a stop formation 110 fixedly mounted on the output shaft between the free ends of the springs and of a thickness equivalent to the thickness of contact pin 90. As shown, stop formation 110 comprises a pin of the same diameter as pin 90 and positioned at the same radius from the common shaft axis 28. Stop pin 110 may conveniently be supported on a radial arm 108, formed as an integral unit with arm 106 and extending oppositely from the shaft. In normal relation of the input and output shafts, the two pins 90 and 110 are axially aligned with their adjacent ends closely spaced. The longitudinal positions of the pins is such that a transverse plane between their opposing ends is intermediate the width of the driving springs. Hence, in normal shaft relation the springs engage both pins (Fig. 3), whereas relative rotation of the two shafts in either direction causes the pins to become transversely offset, each spring then engaging only one of the pins (Fig. 4). The spring that thus engages contact pin 90 is deflected by the described shaft rotation, exerting equal and opposite yielding torques upon the two shafts, the directions of both torques tending to return the shafts to normal angular relation. Those torques increase substantially linearly with increasing departure of the shafts from normal angular relation.

In accordance with the invention, each of the springs 102, 104, is preferably pre-loaded by a predetermined amount, in the sense that when engaging only stop pin 110, for example, it exerts a definite force thereon. The degree of that pre-loading is preferably adjustable, as by means of the screws 112 and 114, which are threaded into bracket formations 113 and 114 formed by the radially inner ends of keeper plates 103 and 105, respectively. Locking means, such as the lock nuts 116, are preferably provided. The screw ends preferably engage the respective outer faces of springs 102 and 104 at points relatively closely spaced from their fixed end portions. Arm 106 is relieved below the points of screw contact, as at 109, and continuously from those points to stop pin 110, permitting the springs to be bowed slightly inwardly by pressure of the respective adjusting screws. Screw adjustment then provides convenient variation of the yielding pressure exerted by the springs against stop pin 110. Alternatively, for example, the springs may be pre-formed to exert an excessive force on the stop pin, and suitable means, such, for example, as screws placed like 112 and 114 but engaging the opposite face of each spring, may be provided for adjustably reducing that force to produce the desired value.

In the illustrative mechanism just described, contact pin 90 is mounted on the input shaft, and thus acts as a driving formation, the means 100 being yieldingly driven thereby. Although that arrangement is ordinarily preferred, resilient means such as 100 may be mounted on the input shaft and may yieldingly drive a contact formation, such as pin 90, rigidly mounted on the output shaft.

To obtain optimum filtering action from the coupling mechanism such as has been described, it is desirable to provide effective means for damping movement of the driven shaft. Illustrative damping means for that purpose comprise the circular disk 120, preferably of material having very low electrical resistance, which is fixedly mounted on output shaft 60 as by the hub 122 and set screw 123; and the permanent magnets 124 and 126, which are mounted in fixed relation to the frame in closely spaced relation to the respective faces of disk 120. As shown, magnets 124 are fixedly mounted on frame plate 54 by the screws 125 and spacing disk 128, and magnets 126 are fixedly mounted on frame plate 23 by the screws 127. The degree of damping provided by such damping means may be adjusted, for example by selection of the number and strength of the magnets provided and by control of the air gap between the magnets and disk 120. That damping is preferably selected with regard to the total moment of inertia of the output shaft and the parts that move with it, and also with regard to the spring rate of the springs 102, 104, so that the output shaft is approximately critically damped. A more precise definition of the degree of damping that has been found to produce a particularly effective result is discussed below.

An output signal from shaft 60 may be obtained in many different ways. For some purposes, for example, it may suffice to mount a pointer rigidly on the rearward end of the output shaft and to observe directly the movement of such an indicator. Ordinarily it is preferable to provide angle data in electrical form for transmission to a remote location. As illustrated, the mechanism includes electrical angle data transmitting means of two independent types. A variable transformer of synchro type is indicated typically at 130, with its rotor 132 rigidly mounted on output shaft 60 and its stator 134 mounted on the frame in a manner permitting rotational adjustment about axis 28. As shown, stator 134 is fixedly mounted by the ring 135 and brackets 136 on a support 137, which has the form of a spur gear. Gear 137 is rotatably mounted on boss 52 of frame plate 50, one face of the gear being held in frictional engagement with the face of that plate, as by the spring retaining ring 139. Gear rotation may be further resisted by the O-ring 133, set in a groove in plate 50 and frictionally engaging the gear face.

The rotational position of gear 137 about axis 28 is preferably adjustable from the exterior of the instrument housing. Particularly effective mechanism for that adjustment is provided by the rod 140, which is journaled in frame plate 23 and rear frame ring 73 on an axis parallel to main axis 28. A pinion 142 is rigidly mounted on rod 140 and engages gear teeth 138 on the periphery of gear 137. The forward end of rod 140 is received by a through bore 144 in cover plate 34 and is provided with a fitting, such as the screw driver slot 145, which is accessible for rotary adjustment from the front of the completely assembled instrument. The rearward end of rod 140 is preferably similarly received by a bore 146 in the rear wall of cover 80, and is provided with a fitting 147 accessible from the back of the assembled instrument. A seal for bore 146 is preferably provided, as by an O-ring 148 set in a counterbore in frame ring 73. Rod 140, as shown, lies close to the cylindrical wall of the instrument housing, a suitable clearance aperture being provided in frame plate 54 at 149.

The second type of angle data transmitter shown illustratively in the drawings comprises the potentiometer 160. A potentiometer brush 166 is mounted by means of the resilient arm 167 in insulated relation on the end of arm 106 to turn with output shaft 60. An arcuate potentiometer winding is represented at 162, mounted on the outer cylindrical surface of ring 135 by means of the bracket 163. As shown, winding 162 is of flat section, and brush 166 engages its forward edge. The potentiometer winding is normally fixed with respect to the instrument frame, but is adjustable about main axis 28 with gear 138 by rotation of rod 140 in the manner already described for adjustment of synchro stator 134. That arrangement provides the great advantage that a single adjusting mechanism may be employed for controlling which ever type of ouput is employed in a particular instrument installation.

Electrical connections to synchro rotor 132 and to potentiometer brush 166 are brought from respective terminals 152, fixed in insulative bushings 153 in holes in the rear face of frame plate 50, via light coil spring 154 to terminals 155, fixed in the insulative hub 156 on output shaft 60. Insulated leads, omitted from the drawings for clarity of illustration, may be carried from terminals 155 through shaft bearing 62 in the central bore 158 in the shaft, with transverse opening at 159. A protective cover disk 170 is preferably mounted, as by the spacers 171 and screws 172, in spaced relation to the rear face of frame plate 50, forming a partially enclosed chamber around the electrical connecting springs 154.

In operation, the preloading of the resilient coupling device between the input and output shafts, represented in the present embodiment by the springs 102 and 104 and their associated mechanism, is so determined by adjustment or otherwise that when the shafts are in their normal mutual position, with driving pin 90 and stop pin 110 in alignment, each of the springs exerts on those pins a force sufficient, and preferably just sufficient, if applied to driving pin 90 alone, to overcome the breakaway friction of the output system. Then, any movement of the input shaft will tend to cause one spring or the other to exert its entire force upon driving pin 90, and will tend to cause the other spring to exert its entire force upon stop pin 110, as shown for an extreme illustrative position of the parts in Fig. 4. But that condition immediately initiates movement of the output shaft in a direction to restore normal relation of the two shafts, since the force applied exceeds the breakaway friction even for extremely small shaft movements. Hence, if the input shaft movement corresponds to a frequency less than the natural frequency of the output system, the two shafts maintain their normal mutual relation almost precisely. In the present embodiment, that means that they move virtually as one.

On the other hand, if the input shaft moves with a frequency much higher than the natural frequency of the output system, the forces exerted by springs 102 and 104 are insufficient to cause the output shaft to keep pace. The greater the frequency difference, the more the output shaft tends to remain stationary, effectively filtering out the high frequency components of the initial input signal.

A particular advantage of the described mechanism, when employed, for example, as an angle of attack indicator for aircraft of any type, is that the natural frequency of the output system can be made relatively low, insuring relatively low cut-off frequency for the filtering action. Yet the precision of indication in the useful frequency range of the instrument is substantially unimpaired and the speed of response is highly satisfactory.

As an illustration, it has been found that excellent operation may be obtained in an instrument of the type described in which the moment of inertia of the input system, comprising vane 40, shaft 30, arm 92 and pin 90, is approximately 350 gm. cm.$^2$, the vane being of such size and design as to exert a torque of about 250 gm. cm. per degree of deflection at an indicated air speed of 200 knots. The corresponding natural frequency of the input system is then approximately 30 cycles per second at the stated speed, and increases with speed. It is difficult to reduce that value appreciably without loss of accuracy and sensitivity of the instrument at low frequency. However, by providing an output system of the type described, the cut-off frequency of the overall response may be substantially as low as may be desired, for example 5 cycles per sec. For example, the output system may have a moment of inertia of approximately 250 gm. cm.$^2$, and the coupling springs may each provide a restoring moment of approximately 4 gm. cm. per degree, giving a natural frequency of the output system of about 5 cycles per sec. Such an instrument has been found to reproduce faithfully changes of direction of an airstream from zero frequency up to about two cycles per second, and to filter out such changes with increasing effectiveness at higher frequencies. That filtering action is highly effective at 10 cycles per second and is virtually complete, for example, at 30 cycles per second, at which a conventional instrument would give a large response. Yet the accuracy of response at low frequency is substantially undiminished by the filtering mechanism.

We claim:

1. A mechanical low band pass filter mechanism, comprising a frame, input and output shafts journaled coaxially on the frame and having a normal mutual angular relation, two spring means mounted on one shaft and engaging respective formations mounted on the other shaft, said spring means being preloaded to exert appreciable forces upon said respective formations in said normal relation of the shafts, said forces opposing departures of the shafts from said normal relation in respective directions, and stop means mounted on said one shaft in position to prevent the said engagement of the respective springs in response to departures of the shafts from said normal relation in the opposite directions.

2. A mechanical low band pass filter mechanism, comprising a frame, input and output shafts coaxially journaled with respect to the frame, structure mounted on one shaft and forming two oppositely facing contact surfaces offset from the shaft axis, structure mounted on the other shaft and forming two oppositely facing stop surfaces corresponding respectively to said contact surfaces, said contact surfaces and said stop surfaces forming pairs of corresponding surfaces lying substantially in respective common axially extending planes in normal mutual angular relation of the shafts, spring means comprising two leaf springs extending generally parallel to the respective said planes, means supporting one end of each spring with respect to said other shaft, the other end of each spring yieldingly engaging both surfaces of one of said pairs of corresponding surfaces in normal relation of the shafts, and engaging only one surface of said pair in other mutual angular relations of the shafts and means actuable to vary the force exerted by said springs on said pairs of surfaces in normal relation of the shafts.

3. A device for indicating the direction of a fluid stream adjacent an outer surface of an aircraft, said device comprising structure forming a housing having an outer face, means for mounting the housing in an aircraft with the outer face substantially flush with an outer surface of the aircraft, a shaft journaled with respect to the housing on an axis transverse of the outer face, sensing structure mounted on the shaft and responsive to the direction of a fluid stream externally adjacent the outer face, output means mounted within the housing and including two cooperating elements mounted for relative rotation with respect to a common axis and acting to develop an output signal representing their relative rotational position, driving means coupling one of the elements to the shaft for rotation therewith, and control means actuable to vary the rotational position of the other element with respect to the housing, said control means including a driving shaft journaled within the housing parallel to said axis, and a driving connection between said other element and the driving shaft, the outer end of the driving shaft being accessible from outside the housing through the outer face thereof.

4. A device for indicating the direction of a fluid stream, comprising structure forming a housing, a shaft journaled with respect to the housing, sensing structure mounted on the shaft externally of the housing and responsive to the direction of a fluid stream, output means mounted within the housing and comprising two cooperating relatively rotatable direct current elements acting to develop a direct current signal representing their relative rotational position, two cooperating relatively rotatable alternating current elements acting to develop an alternating current signal representing their relative rotational position, means supporting one of the direct current elements and one of the alternating current elements for rotation together about a common axis in response to shaft rotation, a support mounted with respect to the housing for rotation about said common axis, means mounting the other direct current element and the other alternating current element on the support for rotation therewith, and control means acting to vary the rotational position of the support.

5. A device for indicating the direction of a fluid stream adjacent an outer surface of an aircraft, said device comprising structure forming a housing having substantially parallel front and rear faces, means for mounting the housing in an aircraft with the front face substantially flush with an outer surface of the aircraft, a shaft journaled with respect to the housing on an axis transverse of the housing faces, sensing structure mounted on the shaft and responsive to the direction of a fluid stream externally adjacent the front face, output means mounted within the housing and including two cooperating elements mounted for relative rotation with respect to a common axis and acting to develop an output signal representing their relative rotational position, means coupling one of the elements to the shaft for rotation therewith, and control means actuable to vary the rotational position of the other element with respect to the housing, said control means including a support mounted with respect to the housing for rotation about said common axis, means mounting the other element on the support, a control shaft journaled with respect to the housing, the ends of the control shaft being accessible for manual rotation from outside the housing through the front and the rear face thereof, respectively, and a driving connection between the control shaft and the support.

6. A device for indicating the direction of a fluid stream, comprising structure forming a housing, an input shaft journaled with respect to the housing, sensing structure mounted on the shaft externally of the housing and responsive to the direction of a fluid stream, an output shaft journaled with respect to the housing in coaxial relation to the input shaft, spring means mounted on one shaft and including respective opposedly spaced faces and means yieldingly urging said faces toward each other, a contact formation mounted eccentrically on the other shaft between the said faces, and engaging both said faces when the shafts have a predetermined angular relation, engagement of said faces exerting respective yielding torques in opposite directions upon the output shaft, and stop means mounted on said one shaft and acting in response to shaft departures from said angular relation in respective directions to lift out of engagement with the contact formation that face that would tend to increase the departure, and output means responsive to rotation of the output shaft.

References Cited in the file of this patent

UNITED STATES PATENTS

| | | |
|---|---|---|
| 996,253 | Johnson | June 27, 1911 |
| 1,072,647 | Pifer | Sept. 9, 1913 |
| 1,962,993 | Leece | June 12, 1934 |
| 2,127,847 | Schulte | Aug. 23, 1938 |
| 2,244,148 | Graham | June 3, 1941 |
| 2,263,113 | Wichorek et al. | Nov. 18, 1941 |
| 2,263,987 | Finch | Nov. 25, 1941 |
| 2,557,856 | Angst et al. | June 19, 1951 |
| 2,570,776 | Dehmel | Oct. 9, 1951 |
| 2,609,685 | Andresen | Sept. 9, 1952 |
| 2,611,051 | Kolff | Sept. 16, 1952 |
| 2,699,065 | Blair | Jan. 11, 1955 |